UNITED STATES PATENT OFFICE.

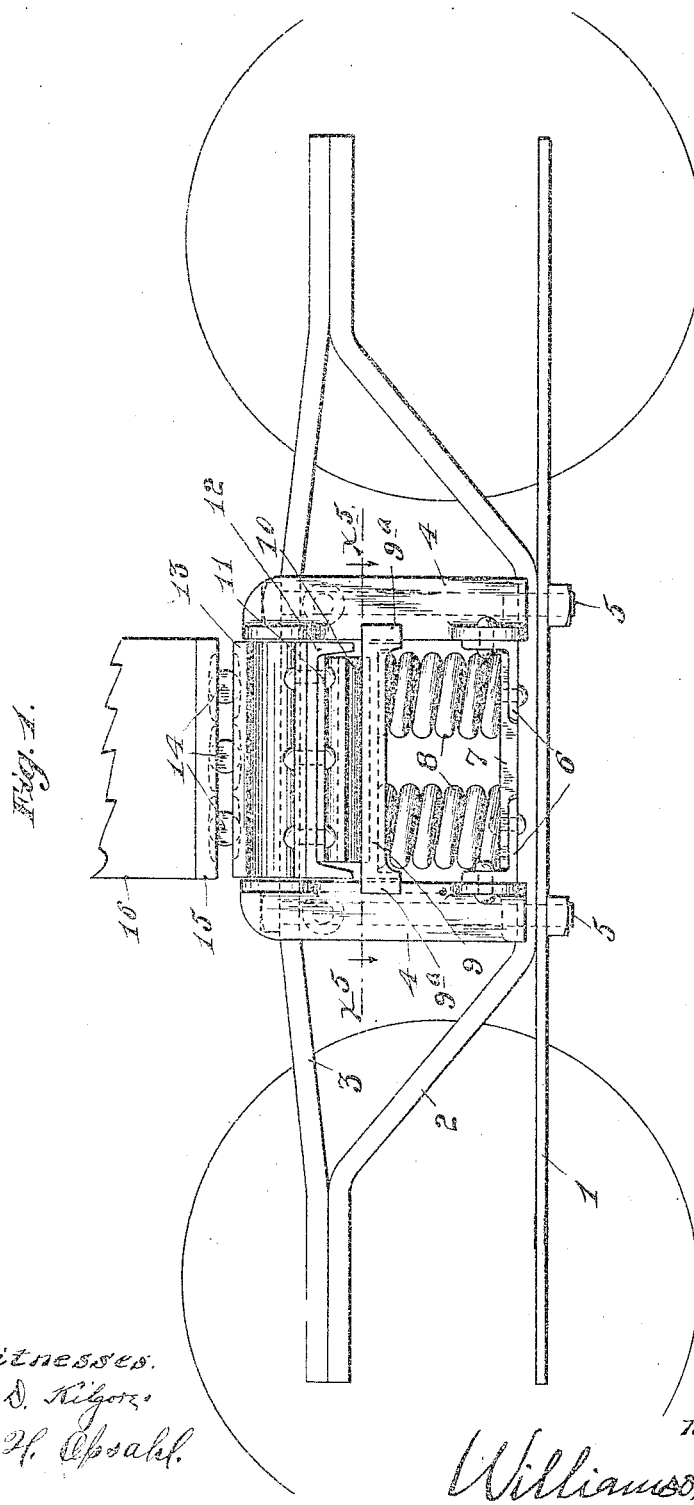

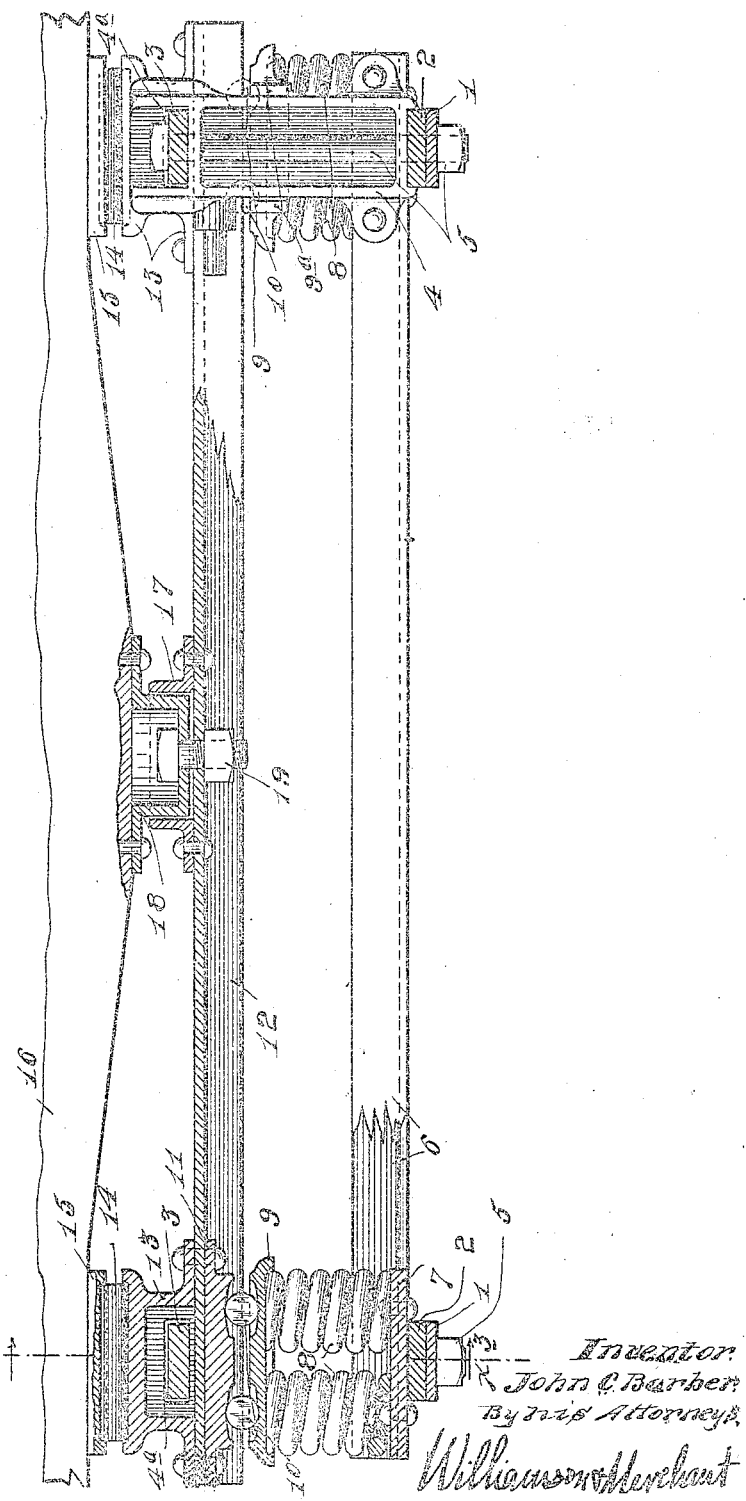

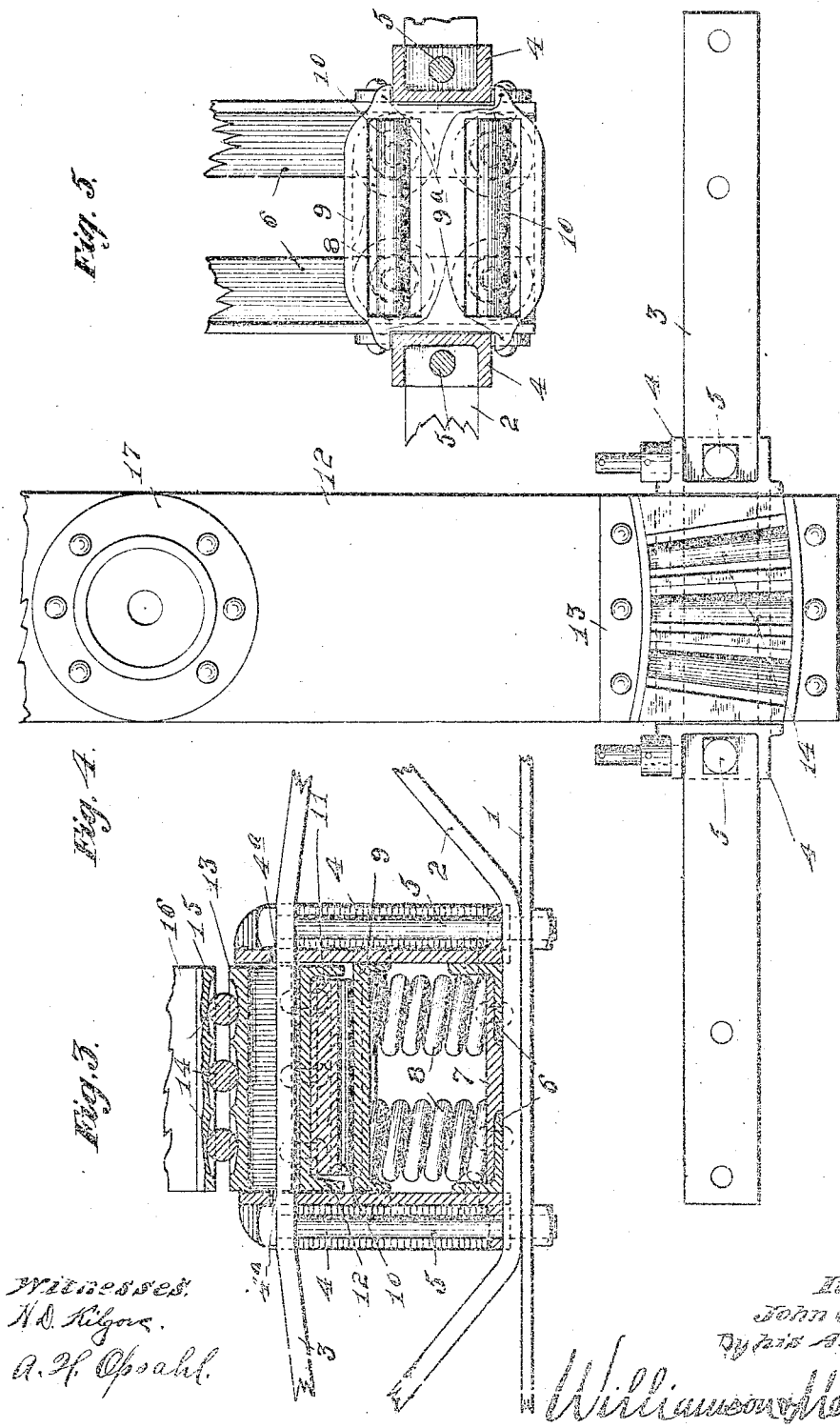

JOHN C. BARBER, OF CHICAGO, ILLINOIS.

CAR-TRUCK.

No. 875,568.

Specification of Letters Patent.

Patented Dec. 31, 1907.

Application filed October 10, 1907. Serial No. 396,802.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to car trucks of the general type disclosed in my numerous prior patents, wherein provision is made for a limited lateral motion of the car body relative to the truck in addition to the customary swiveling or radial motion of said parts, and wherein both the lateral and the radial motions are taken on anti-friction rollers.

More specifically stated, my present invention is in the same line as my prior patent 863,012 of August 13, 1907, and the Lake and Deverell patent 798,350 of August 29, 1905, therein referred to, by reference to which prior patents it will be seen that in the car trucks therein disclosed, the car body and its load is carried from the corners of the car through the said antifriction lateral motion and radial motion bearing devices.

My present invention has for its object to further improve this type of truck with a view of securing increased efficiency; and, to this end, it consists of the novel devices and combinations of devices hereinafter described and defined in the claims.

The accompanying drawings, wherein like notations refer to like parts throughout the several views, illustrate my invention.

In said drawings; Figure 1 is a view of my improved truck, chiefly in side elevation but partly in diagram, and with some portions broken away and others removed. Fig. 2 is a cross section through the truck, on the center line of the truck bolster, but with some parts shown in elevation, and others broken away. Fig. 3 is a detail in section, on the line $x^3$ $x^3$ of Fig. 2, with some parts broken away. Fig. 4 is a plan view showing one of the side frames and a portion of the truck bolster; and Fig. 5 is a detail in horizontal section, on the line $x^5$ $x^5$ of Fig. 1.

The numerals 1 represent the bottom tie bars, 2 the bottom arch bars, 3 the top arch bars, and 4 the bolster columns, all rigidly connected by the column bolts 5 and constituting the side frames of the truck. The side frames are, of course, supported from the journal boxes of the truck in the customary way. The opposite side frames are connected by cross ties 6 of angle form, the opposite ends of which are riveted or otherwise secured to the opposite pairs of bolster columns 4, with the horizontal flanges of the angle bars set facing each other, as clearly shown in Figs. 1 and 2. Base plates 7 for the bolster springs 8 are riveted or otherwise rigidly secured to the horizontal flanges of the cross tie bars 6 between the pairs of columns 4. The central portions of said plates 7 are thicker than their end portions so as to fill the space between the flanges of the tie bars 6. Plates 9 cap the springs 8 and support lateral motion rollers 10. On the rollers 10, rest the upper members 11 of the lateral motion bearing plates, these being riveted or otherwise rigidly secured to the truck bolster 12. The truck bolster 12 is of channel form with its vertical flanges turned downwards and works underneath the top arch bars 3. To the upper surface of the bolster 12, at its opposite ends, are secured the lower members 13 of the side bearings or radial motion bearing plates. These side bearings 13 are of such construction that they are adapted to straddle the top arch bars 3 of the side frames, when riveted or otherwise rigidly secured in proper position on the truck bolster 12; and are also of the proper construction to afford the requisite clearance for the spring cushioned or vertical motion of the bolster 12, and to permit and limit the lateral motion of the bolster 12 on the rollers 10.

On the side bearings 13 rest the side or radial motion rollers 14, disposed on lines radial to the cross center of the truck. On the rollers 14 rest the upper members 15 of the side bearing plates, these being rigidly secured to the body bolster 16. The swiveling connection between the truck bolster 12 and the body bolster 16 is afforded by a pair of telescoping plates marked 17 and 18, rigidly secured, respectively, one to the truck bolster and the other to the body bolster at the cross center of the car. These two plates 17 and 18 are shown as connected by a nutted king bolt 19. The telescoping center plate members 17 and 18 do not contact with each other in a vertical direction; or, otherwise stated, they take no part of the load, but simply effect the swiveling connection between the car body and the truck.

The plates 9, which serve as spring caps and lower bearing plates for the lateral motion rollers 10, have projecting lugs 9ª which embrace the bolster columns 4 and coöperate therewith, to guide said plates in their vertical motion and to hold the same from any lateral motion or any forward or backward motion. The bolster columns 4 extend upward beyond the top arch bars 3 of the side frames, and are slotted or otherwise formed with the proper openings 4ª to pass the said arch bars through their main webs, as clearly shown in Figs. 1, 2 and 3. The lower side bearings 13, which straddle the top arch bars, as hitherto noted, are made of such size, in the dimension thereof lengthwise of the truck, that the ends thereof form upward extensions of the vertical faces of the truck bolster, as best shown in Figs. 1 and 3; and hence, it follows that said side bearing brackets 13 may be treated as parts of the truck bolster in their relations to the bolster columns 4. The bolster columns 4 are extended upward beyond the top arch bars 3, as described, so as to sustain said relation to said parts 13. From these relations of said parts 4, 12 and 13, it follows that the forward and backward thrusts on the bolster 12 are delivered partly through the bolster proper and partly through the said bearing brackets 13; and these strains, so delivered, are taken by the columns partly above and partly below the top arch bars 3. This affords a good construction for taking the said strains to the best advantage, while, at the same time, enabling the truck bolster to be kept beneath the top arch bars and nevertheless have the requisite freedom for the desired lateral motion and the required clearance for the vertical or spring cushioned motion.

Comparing with the prior patents above noted, it will be seen that in both, the said Barber patent 863,012 and said Lake and Deverell patent 798,350, the truck bolster had vertical or spring cushioned motion only, while the lateral motion was taken on the truck bolster through the intermediate or so-called floating plate located between the lateral motion and the radial motion rollers. It followed, of course, that the swiveling center plate members had to be of such construction as to permit this lateral motion of the car body relative to the truck bolster, and one or the other had to be slotted to give the clearance for the lateral travel of the king bolt. It is obvious that this difficulty is overcome in the present design. The body bolster and the truck bolster, in the present design, always travel laterally together, and, therefore, always swivel or turn angularly in respect to each other on a constant center, in the radial motion; and this relation of the said parts affords a more reliable and stable connection for the most advantageous distribution of the strains. The advantage in this respect is the same as that set forth in my pending truck case filed September 30, 1907, under S. N. 395,114. It is there shown, however, as realized in a girder-type of side frames, and is herein shown as realized in an arch bar type of side frames. The bearing surfaces of the plates 9 and 11 for the interposed lateral motion rollers 10 are of the kind disclosed and claimed in Patent 784,096, granted to Lee W. Barber, of date March 7, 1905, and have all the advantages therein noted.

What I claim is:—

1. In a car truck having side frames of the arch bar type, the combination with bolster columns rising above the top arch bars, of top arch bars passing through the said columns, and a truck bolster working below the said top arch bars and provided with side bearings rising above the same and coöperating therewith to distribute the forward and backward thrusts to the said columns, partly above and partly below the said top arch bars, substantially as described.

2. The combination with arch bar side frames, of truck and body bolsters connected for swiveling motion in respect to each other, lateral motion rollers and radial motion rollers supporting the car body and its load through the side bearings, with the truck bolster laterally movable below the top arch bars on the lateral motion rollers and having fixed thereto the lower bearings for the radial motion rollers with the same constructed to straddle the top arch bars and afford the requisite clearance for the vertical and lateral motion of said bolsters, substantially as described.

3. The combination with arch bar side frames, of truck and body bolsters connected for swiveling motion in respect to each other, lateral motion rollers and radial motion rollers supporting the car body and its load through the side bearings, with the truck bolster laterally movable below the top arch bars on the lateral motion rollers and having fixed thereto the lower bearings for the radial motion rollers, with said bearings constructed to straddle said arch bars and afford the requisite clearance for the vertical and lateral motions of said bolster, and bolster columns rising above the top arch bars and receiving the forward and backward thrusts partly from the bolster proper and partly from said lower side bearings fixed thereto, substantially as described.

4. In a car truck having side frames of the arch bar type, the combination with the bolster columns 4 rising above the top arch bars, of the top arch bars 3 passing through the said columns, the bolster supporting springs 8, the plates 9 with lugs 9ª embracing said columns, the lateral motion rollers 10 on said plates 9, the truck bolster 12 having the plates 11 resting on said rollers 10, with said truck bolster located below the top arch bars and having the side bearings 13 straddling the top arch bars and working between the upper ends of said bolster columns 4, as described, the radial motion rollers 14 on said bearings 13, the body bolster 16 having the plates 15 resting on the rollers 14, and the swiveling plates 17 and 18 connecting said bolsters 12 and 16, all for coöperation substantially as described.

In testimony whereof I affix my signature in presence of two witnesses.

JOHN C. BARBER.

Witnesses:
 H. D. KILGORE,
 F. D. MERCHANT.